US010336450B2

(12) United States Patent
Graham

(10) Patent No.: US 10,336,450 B2
(45) Date of Patent: Jul. 2, 2019

(54) ENHANCED NET PITCHING MOMENT MULTI-WING VTOL COMPACT PERSONAL AIRCRAFT

(71) Applicant: Brendan Graham, Miami, FL (US)

(72) Inventor: Brendan Graham, Miami, FL (US)

(*) Notice: Subject to any disclaimer, the term of this patent is extended or adjusted under 35 U.S.C. 154(b) by 0 days.

(21) Appl. No.: 15/683,870

(22) Filed: Aug. 23, 2017

(65) Prior Publication Data

US 2018/0093765 A1  Apr. 5, 2018

Related U.S. Application Data

(60) Provisional application No. 62/402,080, filed on Sep. 30, 2016.

(51) Int. Cl.

| B64C 39/12 | (2006.01) |
|---|---|
| B64C 29/02 | (2006.01) |
| B64C 39/08 | (2006.01) |
| B64C 1/28 | (2006.01) |
| B64C 27/26 | (2006.01) |
| G05D 1/10 | (2006.01) |
| G05D 1/08 | (2006.01) |

(52) U.S. Cl.
CPC .............. *B64C 29/02* (2013.01); *B64C 1/28* (2013.01); *B64C 27/26* (2013.01); *B64C 39/08* (2013.01); *G05D 1/0858* (2013.01); *G05D 1/102* (2013.01); *B64C 2201/088* (2013.01); *B64C 2201/104* (2013.01); *B64C 2201/108* (2013.01); *B64C 2201/165* (2013.01)

(58) Field of Classification Search
CPC ....... B64C 29/00; B64C 29/02; B64C 29/033; B64C 39/08; B64C 39/026; B64C 1/28; B64C 2201/088; B64C 2201/104; B64C 2201/165

See application file for complete search history.

(56) References Cited

U.S. PATENT DOCUMENTS

| 9,346,542 | B2 * | 5/2016 | Leng | B64C 29/0025 |
|---|---|---|---|---|
| 2017/0057630 | A1 * | 3/2017 | Schwaiger | B64C 3/385 |
| 2018/0002012 | A1 * | 1/2018 | McCullough | B64C 29/0033 |
| 2018/0044011 | A1 * | 2/2018 | Reichert | B64C 11/28 |
| 2018/0065741 | A1 * | 3/2018 | Vondrell | B64C 3/32 |
| 2018/0086448 | A1 * | 3/2018 | Kroo | B64C 29/0033 |

* cited by examiner

*Primary Examiner* — Richard G Davis
(74) *Attorney, Agent, or Firm* — Intellent Patents LLC; Ahmed Alhafidh

(57) ABSTRACT

This disclosure describes a multi-wing manned or unmanned compact personal vertical takeoff and landing aircraft, comprising the integration of: a plurality of parallel wings forming a boxed planform multi-wing assembly with no dynamic airfoil control surfaces, statically affixed to a co-planar adjacent counter-rotating quad-rotor air propulsion system; and a fuselage free to rotate under servo control about an axial shaft, permitting dynamic orientation manipulation. The vehicle described herein achieves: high maneuverability and attitude orientation control incumbent upon the ratio of power delivered to the quad-rotors; area constrained and enhanced wind gust insensitive VTOL capability; high fuel efficient non-hover aerodynamic flight capability; high external field-of-view optical visibility from the fuselage interior; convenient fuselage interior accessibility; and enhanced net pitching moment of inertia about the multi-wing assembly net aerodynamic center, permitting rapid transitioning to and from aerodynamic flight orientation.

1 Claim, 4 Drawing Sheets

ENHANCED NET PITCHING MOMENT MULTI-WING VTOL COMPACT PERSONAL AIRCRAFT

CROSS-REFERENCE TO RELATED APPLICATION

This application claims the benefit of U.S. Provisional Application No. 62/402,080, filed Sep. 30, 2016.

BACKGROUND OF THE INVENTION

The present invention, hereafter referred to as CPA, generally relates to the field of flying machines. More particularly, the present invention is related to rotary wing and fixed wing aircraft incorporating multiple wings attached to multiple rotors and a fuselage of teardrop shape.

Contemporary rotary wing aircraft and co-planar multi-rotor, multi-copter aircraft alike such as the typical well known co-planar quad-copter suffer nonlinear inefficiencies during both hover and non-hover horizontal flight conditions. In the specific case of co-planar multi-copter type aircraft, much inefficiency results from the use of small diameter fixed pitch rotors. In the general case of rotary wing aircraft, much inefficiency is incurred as a result of rotor induced turbulence and lift dissymmetry below and above the best rate of climb velocities respectively. During hover and horizontal flight conditions, co-planar multi-copters mitigate the induced roll effect due to lift dissymmetry with pairs of complimentary counter rotating rotors while the mono-rotor helicopter makes use of dynamic pitch control of the main rotor and torque control with a tail rotor. The counter rotating dual-rotor helicopter resolves lift dissymmetry in a similar manner as the co-planar multi-copter. Due to the low cost simplicity of small diameter fixed pitch rotors used in the co-planar multi-copter, overall rotor efficiency is impaired relative to the traditional large diameter helicopter rotor, with peak efficiency occurring near a single RPM.

Traditional rotary wing aircraft in general suffer from common high aerodynamic drag inefficiencies incurred during the lifting of high mass payloads at high horizontal air velocities. When such capability is required the designer of a heavy lifting helicopter must resort to expensive large diameter rotors and a similarly expensive and complicated, high drag rotor hub. Helicopter rotor lift is a function of rotor diameter, rotor blade number and radial velocity and thus there exist significant physical limitations involved in the design and production of an optimized rotary wing. In general aviation, the task of lifting high mass payloads are left to the much more suitable airplane.

Propeller driven fixed-wing aircraft mitigate rotary wing inefficiencies incurred at high horizontal air velocities and enable the lifting of high mass payloads by overcoming the lower induced drag incurred in moving a comparatively lower velocity, low wing-loading, high lift generating, low drag coefficient airfoil in the direction of aircraft motion. Together with a reduced power output propulsion system, the combination results in an aircraft with much diminished overall induced drag and therefore higher fuel efficiency.

SUMMARY OF THE INVENTION

Powered air breathing aircraft may be classified as either airplane, vertical take-off and landing hereinafter referred to as VTOL or rotary wing aircraft. Both the airplane and VTOL aircraft incorporate one or more airfoils with mandatory integrated dynamic airfoil control surfaces necessary for maintaining aircraft attitude control and stability. The aerodynamic lift generated by the airplane and VTOL aircraft airfoils are sufficient to permit support of the full weight of these aircraft within their operational cruise velocity range. Tilt-wing and tilt-rotor VTOL aircraft integrate dynamic airfoil control surfaces within their wings, necessary for attitude control and stability. Although the CPA during non-hover flight maneuvers may have the semblance of a vertically stacked multi-plane main wing section, as the CPA contains no integrated dynamic airfoil control surfaces, it cannot be classified as any version of either contemporary fixed wing airplane or VTOL aircraft.

Rotary wing aircraft such as the helicopter do incorporate airfoils other than their rotors that are necessary for anti-rotation, attitude stability control and armament purposes only. Such airfoils provide no significant net aerodynamic lift to the helicopter at any attitude. Some helicopters have been augmented with horizontally orientated, high wing loading, fixed wing airfoils of significant net lift generating capability at high air velocities but contribute to an overall diminished specific distance. Due to an integrated, dynamic orientation controllable multi-wing assembly, the CPA cannot be classified as a contemporary helicopter.

The present invention disclosure describes a multi-wing manned or unmanned compact personal vertical takeoff and landing aircraft, comprising the integration of: a plurality of parallel wings forming a boxed planform multi-wing assembly with no dynamic airfoil control surfaces, statically affixed to a co-planar adjacent counter-rotating quad-rotor air propulsion system; and a fuselage of teardrop shape free to rotate under servo control about an axial shaft, permitting dynamic orientation manipulation. The aircraft described herein achieves: high maneuverability and attitude orientation control incumbent upon the ratio of power delivered to the quad-rotors; area constrained and enhanced wind gust insensitive VTOL capability; high fuel efficient non-hover aerodynamic flight capability; high external field-of-view optical visibility from the fuselage interior; convenient fuselage interior accessibility; and enhanced net pitching moment of inertia about the multi-wing assembly net aerodynamic center, permitting rapid transitioning to and from aerodynamic flight orientation.

These aforementioned characteristics are not simultaneously present in either conventional contemporary winged or wingless planar multi-rotor, tilt-wing, tilt-rotor or fixed-wing aircraft.

BRIEF DESCRIPTION OF DRAWINGS

FIG. 4 graph B depicts contraction of the trajectory minor elliptical axis during ascent and descent for a CPA with enhanced net pitching moment of inertia about the multi-wing assembly net aerodynamic center due to the aircraft center of mass located proximate to but not coincident with the multi-wing assembly net aerodynamic center.

DETAILED DESCRIPTION OF THE INVENTION

Figure 1:
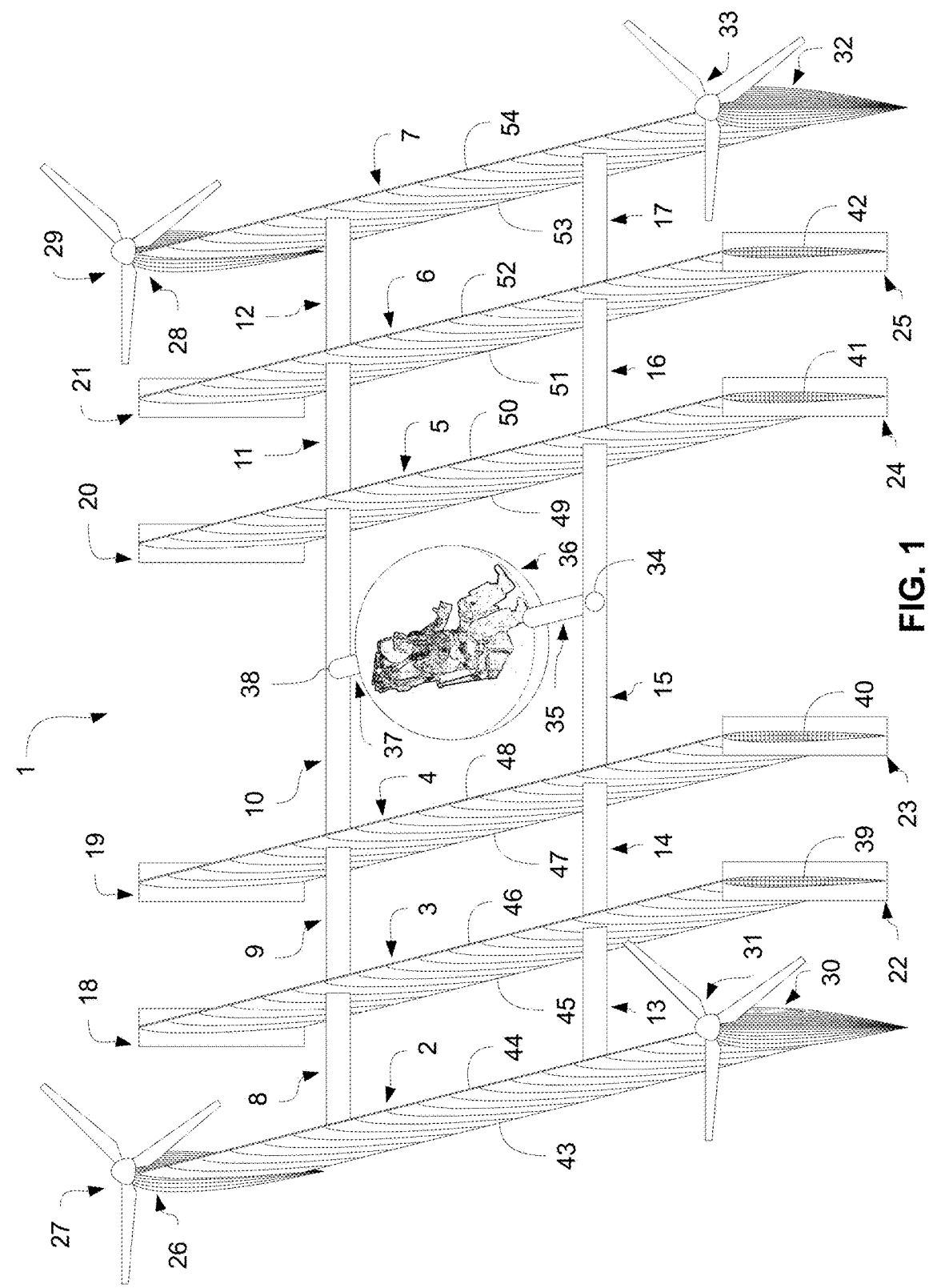
FIG. 1 depicts the horizontal attitude orientation of a preferred embodiment of a CPA with a plurality of parallel wings and a plurality of connecting struts and organized as a boxed rectangular planform multi-wing assembly.

FIG. 1 depicts a preferred embodiment of a CPA 1 with horizontal attitude orientation either stationary on the ground or during hover mode or during the purely vertical flight maneuver. The term horizontal attitude orientation means that the imaginary plane passing through the aerodynamic center of each of a plurality of parallel wings 2,3,4,5,6,7, is a vertical plane.

The figure depicts the concept of a multi-wing assembly comprising the plurality of parallel wings 2,3,4,5,6,7 with exhibited aerofoil cross sections 39,40,41,42 of parallel wings 3,4,5,6. The plurality of parallel wings 2,3,4,5,6,7 are statically connected together with a plurality of structural wing spacing struts 8,9,10,11,12 and 13,14,15,16,17 orthogonal to both chord and span of each of the plurality of parallel wings 2,3,4,5,6,7. The term boxed means that the combination of any two parallel wings 2,3 as an example connected orthogonally by two structural wing spacing struts 8,13 as an example, resembles a rectangular box with depth represented by the chords of parallel wings 2,3. Both leading edges 44,46,48,50,52,54 and trailing edges 43,45, 47,49,51,53 of the plurality of parallel wings 2,3,4,5,6,7 are incident upon an imaginary plane normal to the chords and parallel to the spans of the plurality of parallel wings 2,3,4,5,6,7. Wing end plates 18,19,20,21,22,23,24,25 are depicted as attached to the ends of parallel wings 3,4,5,6.

A co-planar adjacent counter-rotating quad-rotor air propulsion system comprising four rotors 27,29,31,33, with each attached respectively to motors 26,28,30,32 that are depicted in the preferred embodiment as attached to each of two wing tips of the top wing 2 and the bottom wing 7 of the plurality of parallel wings of the multi-wing assembly.

A fuselage 36 is depicted as free to rotate about a fuselage-servo axial shaft 35 with continuation of said axial shaft 37. The orientation of the fuselage 36 is depicted with horizontal orientation such that a pilot may be seated normally and comfortably. Even as the CPA 1, may change orientation from horizontal to vertical, the fuselage 36 may be controlled to rotate about the fuselage-servo axial shaft 35 with continuation of said axial shaft 37 by a fuselage orientation servo such that the fuselage orientation may be made to remain constant relative to the gravity force vector.

A fuselage-servo axial shaft 35 with continuation of said axial shaft 37 and with said axial shaft ends 34,38, is statically attached orthogonally between two structural wing spacing struts 10,15. The fuselage-servo axial shaft 35 with continuation of said axial shaft 37 is affixed with orientation parallel to the span of each of the plurality of parallel wings 2,3,4,5,6,7 of the multi-wing assembly and located at the intersection of: the plane passing through the span and aerodynamic center of each of the plurality of parallel wings 2,3,4,5,6,7 of the multi-wing assembly; and the mid point on a line drawn between aerodynamic centers of the top wing element 2 and bottom wing element 7 of the multi-wing assembly.

Figure 2:
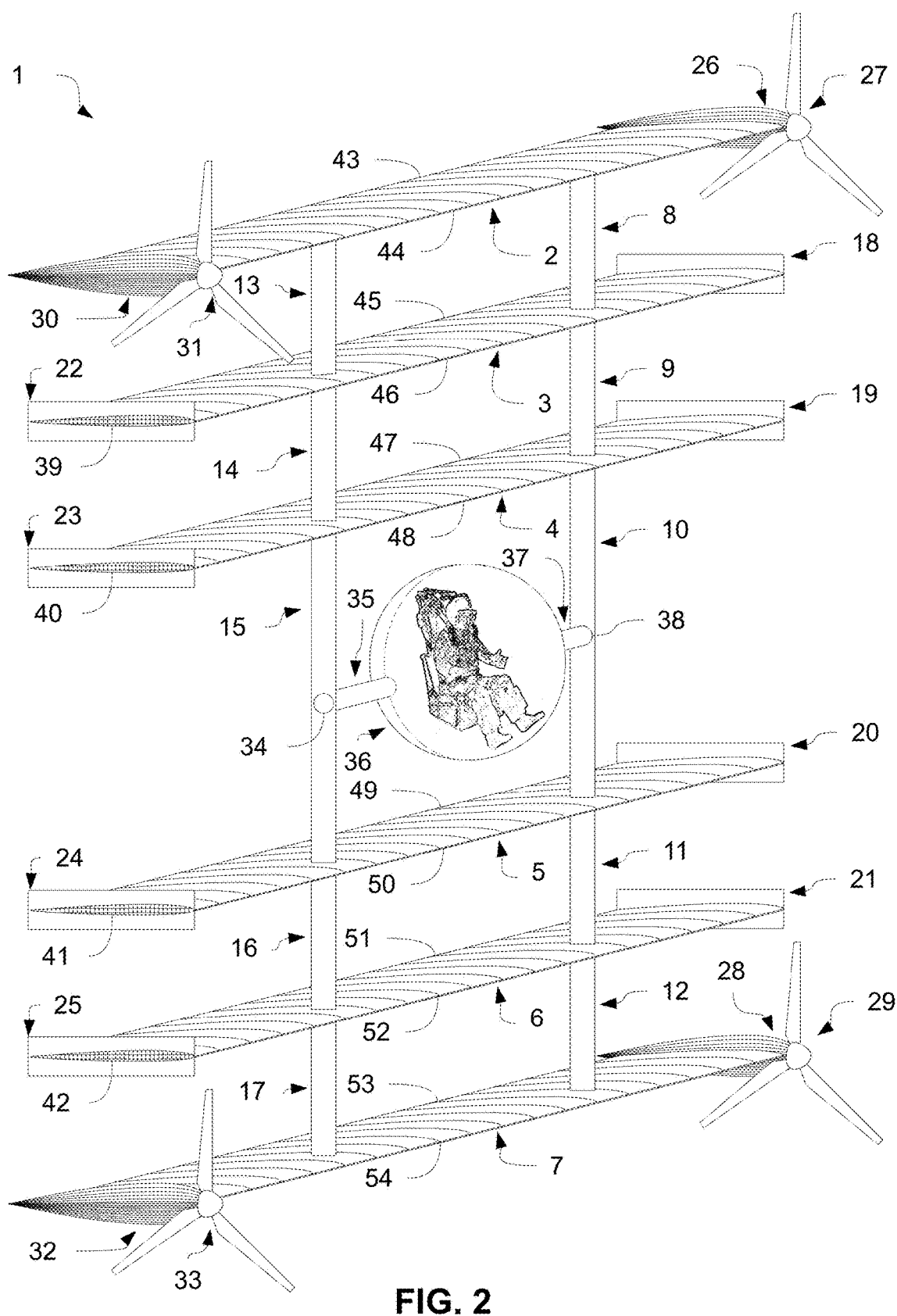
FIG. 2 depicts the vertical attitude orientation of a preferred embodiment of a CPA with a plurality of parallel wings and a plurality of connecting struts and organized as a boxed rectangular planform multi-wing assembly.

FIG. 2 depicts a preferred embodiment of a CPA 1 with vertical attitude orientation during the non-hover mode, purely horizontal flight maneuver where a plurality of parallel wings 2,3,4,5,6,7 provide the aerodynamic lift necessary to fully support the weight of the aircraft. The term vertical attitude orientation means that the imaginary plane passing through the aerodynamic center of each of the plurality of parallel wings 2,3,4,5,6,7, is a vertical plane.

The fuselage 36 is depicted as free to rotate about a fuselage-servo axial shaft 35 with continuation of said axial shaft 37. The orientation of the fuselage 36 is depicted with horizontal orientation such that a pilot may be seated normally and comfortably. Even as the CPA 1, may change orientation from horizontal to vertical, the fuselage 36 may be controlled to rotate about the fuselage-servo axial shaft 35 with continuation of said axial shaft 37 by the fuselage orientation servo such that the fuselage orientation may be made to remain constant relative to the gravity force vector.

Typical Trajectory

Figure 3:
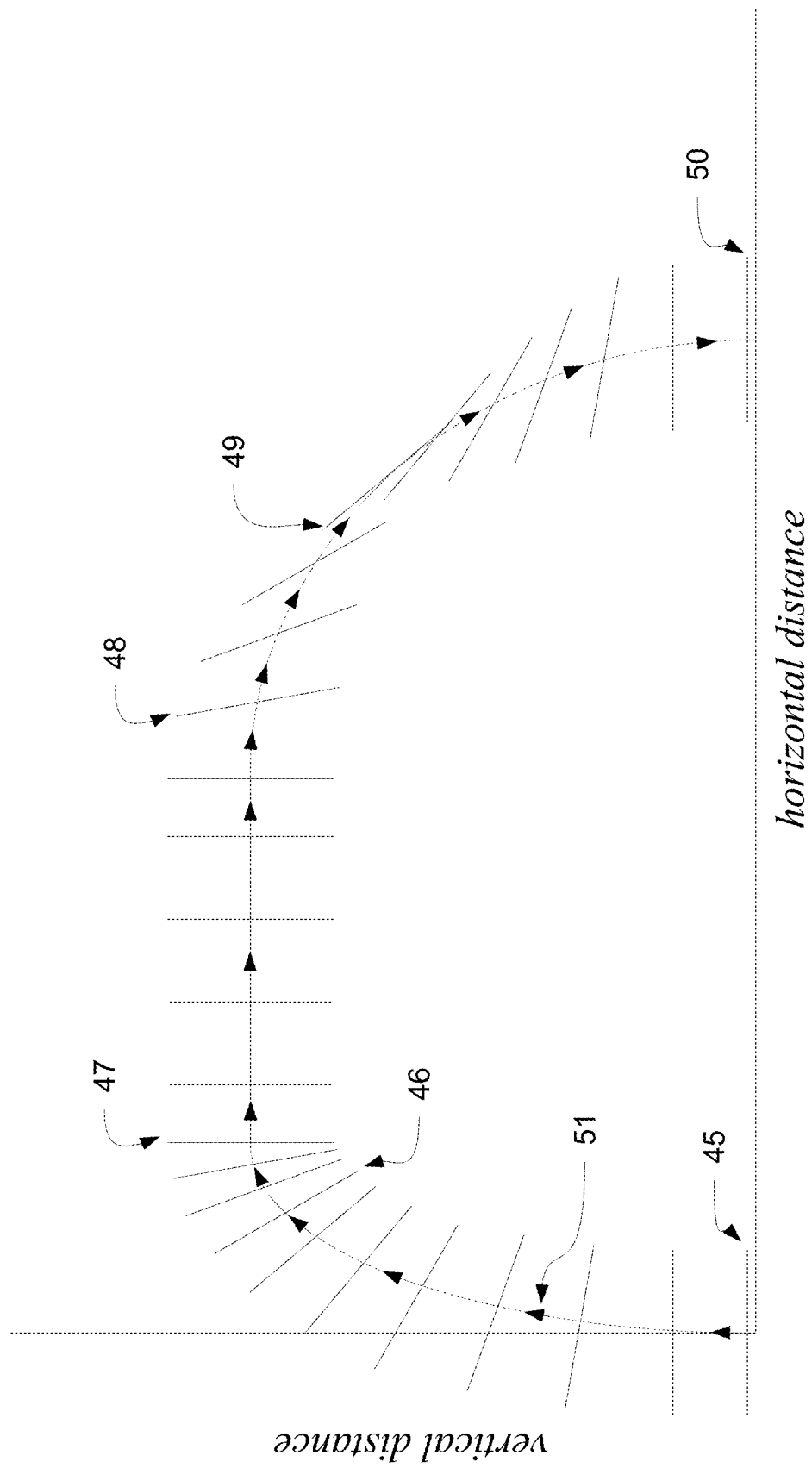
FIG. 3 depicts a typical CPA trajectory and attitude orientation profile from vertical takeoff, through the horizontal flight maneuver, to vertical landing.

FIG. 3 depicts a typical CPA trajectory from vertical takeoff on the far left of the horizontal axis marked "horizontal distance" of the figure, through the horizontal flight maneuver, to a vertical landing position some distance away. The CPA follows a trajectory initially convex elliptical during ascent beginning at ninety degrees to the horizontal, becoming fully horizontal or zero degrees to the horizontal, followed by a convex elliptical descent culminating at ninety degrees to the horizontal, to a stationary position on the ground. During vertical takeoff and landing, the chords of the parallel wings of the CPA multi-wing assembly have a purely vertical orientation, thus the multi-wing assembly provides insignificant induced drag and the CPA demonstrates the VTOL attributes of a helicopter whereby the quad-rotor air propulsion system produces a predominantly vertical thrust component. Although during VTOL, the blown wing effect may produce some horizontal lift components incumbent upon the multi-wing assembly designed static angle of attack, such effect can be compensated for and the attitude stability of the CPA maintained entirely by the dynamically controlled quad-rotor air propulsion system.

As the CPA attains vertical velocity with its attitude entirely under control of the quad-rotor air propulsion system, the multi-wing assembly begins to generate significant lift normal to the direction of motion. At appropriate transitional air velocity, the CPA quad-rotor air propulsion system in combination with the multi-wing assembly generates a sufficient vertical aerodynamic thrust component at the net center of pressure of the multi-wing assembly to provide aerodynamic support of the full weight of the aircraft. With low wing loading and low drag coefficient, the CPA is enabled to transition smoothly from horizontal to vertical operational attitude orientation whilst increasingly achieving high fuel efficiency non-hover flight characteristics commensurate with that of fixed-wing aircraft of similar wing loading. At such time as the CPA achieves full vertical attitude orientation during the horizontal flight maneuver, a minimal vertical thrust component is directly generated by the quad-rotor air propulsion system.

From an initial takeoff position stationary on the ground to another landing position some distance away, the CPA trajectory follows an initial convex elliptical ascent beginning at ninety degrees to the horizontal becoming fully horizontal or zero degrees to the horizontal, followed by a similar convex elliptical descent trajectory culminating at ninety degrees to the horizontal to a stationary position on the ground.

Enhanced Trajectory

Figure 4:
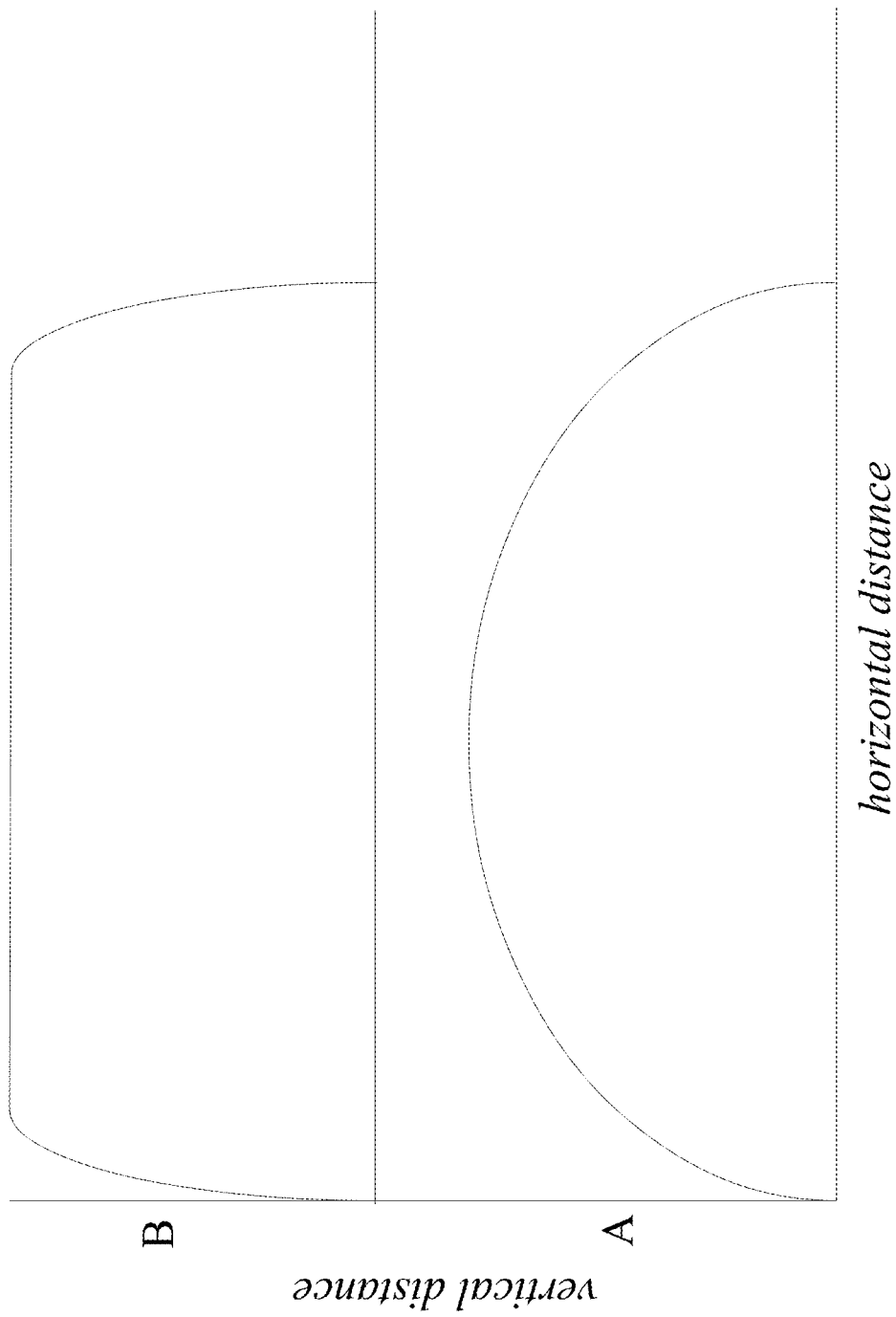
FIG. 4 graph A depicts an elongated minor elliptical axis during ascent and descent of a typical flight trajectory for a planar multi-rotor drone aircraft with a small net pitching moment of inertia due to an elongated fuselage with longitudinal axis parallel to the wings chords and insufficient aerodynamic lift.

FIG. 4 graph B depicts a typical CPA trajectory from vertical takeoff on the far left of the horizontal axis marked "horizontal distance", through the horizontal flight maneuver, to a vertical landing position some distance away. The CPA follows a trajectory initially convex elliptical during ascent beginning at ninety degrees to the horizontal, becoming fully horizontal or zero degrees to the horizontal, followed by a convex elliptical descent culminating at ninety degrees to the horizontal, to a stationary position on the ground. As depicted, the trajectory minor elliptical axis is truncated, as compared to FIG. 4 graph A, during the transition from CPA horizontal to vertical attitude orientation or equivalently from vertical hover mode to horizontal flight.

Enhanced Pitching Moment of Inertia

A VTOL aircraft, with an elongated fuselage of longitudinal axis parallel to the cords of the wings, possesses a diminished net pitching moment of inertia which must be counteracted through the use of either or both: higher net lift through the use of dynamic airfoil control surfaces; and greater thrust vectoring ability necessitating an elevated thrust to weight ratio. Such an aircraft, but with limited thrust capability and by extension limited ability to accelerate, must avoid the inverted pendulum control paradox when transitioning from hover mode to horizontal flight by first attaining sufficient horizontal air speed while in predominantly hover mode where the thrust vector is predominantly vertical.

During transitioning from vertical hover mode to horizontal flight of such an aircraft, it may be expected that: the inherently diminished net pitching moment or inertia due to the fuselage shape and orientation would require a sufficiently large airfoil angle-of-attack leading to aerofoil stall at relatively high airspeed; and the aforementioned torques and thus required thrusts would impart a large asymmetrical distribution between propellers mounted on the top and bottom vertical stabilizers in order to counteract the diminished net pitching moment of inertia generated by the fuselage-wing inverted pendulum design. The conclusion of the above arguments is that such an aircraft embodiment is prone to the classical inverted pendulum control problem requiring anticipatory, predictive or derivative terms in the stability control function. Additionally due to the inverted pendulum effect, an aircraft may only mitigate and counteract such effect by producing and maintaining a substantial horizontal thrust component during an extended duration vertical hover mode to horizontal flight transition. An undesirable result of this situation is, the aircraft attains no benefit of aerofoil lift until attaining high horizontal air speed all the whilst maintaining very low fuel efficient helicopter hover mode attitude.

For a VTOL aircraft with wings sufficient to support aerodynamic flight, the longer the duration spent in high lift airplane mode compared to helicopter hover mode during a trajectory profile, the greater is the aircraft fuel efficiency. For instance the required instantaneous thrust-to-weight ratio of a VTOL aircraft in helicopter mode must be $>=1$ compared to a very plausible 0.2 to 0.4 required for fully aerodynamic lift support of an fixed wing airplane in horizontal flight. As thrust is directly proportional to power, the enhanced net pitching moment of inertia of the CPA enables a more rectangular trajectory profile as such aircraft is thus enabled to transition between vertical and horizontal attitude orientations in a shorter duration of time, contributing greatly to higher fuel efficiency.

FIG. 4 graph A, depicts an aircraft with a diminished net pitching moment of inertia due to an elongated fuselage, with longitudinal axis parallel to the cords of the wings synonymous with an elongation of the trajectory minor elliptical axis during the transition from the aircraft horizontal to vertical attitude orientation or equivalently from vertical hover mode to horizontal flight. FIG. 4 graph B, in contrast, depicts a significant contraction of the trajectory minor elliptical axis of the CPA during VTOL maneuvers.

The CPA is enabled to rapidly transition from the horizontal to vertical orientation, where high fuel efficient horizontal flight capability is achieved. This unique feature is due to an enhanced net pitching moment of inertia about the multi-wing assembly net aerodynamic center due to: an increased radius of gyration due to the plurality of (but not limited to) rectangular planform wings of the high net lifting capacity multi-wing assembly suitable for low induced drag, low Mach number air velocity, with structural simplicity and rigidity, low imposed weight penalty and compact planar horizontal area footprint during VTOL operation; and the aircraft center of mass located proximate to but not coincident with the multi-wing assembly net aerodynamic center.

Industrially Applicable Improvements

The preferred embodiment of the herein described CPA anticipates improvement upon prior aircraft. Multiple unique characteristics of industrial applicability are inherent to the espoused embodiment. These characteristics can be summarized as comprising: an optimization of the number of parallel wings of the multi-wing assembly; enhanced stability and controllability; mitigated manufacturing complexity, maintenance and cost; high fuel efficiency dual role aircraft capability; and dynamic fuselage orientation controllability.

Optimum Number of Parallel Multi-Wings

Mono and bi-winged, flying wing, VTOL aircraft have been proposed. Those comprising a fuselage statically connecting one or two respectively, large aspect ratio parallel wings, while producing adequate lift, suffer from several deficiencies not inherent to the CPA. The use of too few parallel wings does not produce an optimal minimization of a VTOL aircraft's planar horizontal landing or storage area footprint. While such aircraft configurations may suffice for the purposes of a consumer drone aircraft, such configuration scaled up to suitable manned aerial vehicle dimensions does not produce an aircraft suitable for VTOL operations in planar horizontal area constrained environments such as the typical helicopter landing pad found atop urban high-rise buildings or hospitals.

Selection of an optimum plurality of parallel wings of the multi-wing assembly imbues the CPA with a symmetrically compact planar horizontal VTOL area footprint, when in the horizontal operational attitude orientation, thus permitting VTOL maneuvers in area constrained environments where large fixed wing span mono or bi-wing lifting airfoils would render the aircraft unable to land or be efficiently stored. The CPA is thus well suited to the transportation of manned or unmanned payloads within an urban environment with constraints on landing area accessibility.

Essentially, the preferred embodiment of the herein described CPA suggests that, for a required lifting force at a preferred velocity, there exists a wing with chosen airfoil profile and optimal net aspect ratio which may be further subdivided into an optimal integer number of parallel wings such that the cord of each of said parallel wings is minimized. Furthermore said optimal integer number of parallel wings is the number that maximizes the area in the plane bounded on two sides by the spans of top and bottom wings of the multi-wing assembly. The geometric shape of the aforementioned area in the plane is thus essentially a square further enabling symmetric thrust generation and the associated control law.

Enhanced Stability and Controllability

During hover mode with or without horizontal velocity, too few number of parallel wings renders the aforementioned VTOL aircraft's large wing area planform chords vertical oriented. Such planform orientation results in compromised aircraft VTOL aerodynamic stability by providing high drag when exposed to gusting wind conditions that may render the aircraft: uncontrollable and unable to achieve successfully landing; and susceptible to significant perturbation and controllability issues during VTOL and hover mode horizontal maneuvers.

Enhanced stability and controllability is afforded the CPA during VTOL maneuvers. An optimization of the number of parallel wings partially comprising the multi-wing assembly results in the minimization of wing planform cord, thus providing enhanced wind gust insensitive VTOL capability.

Mitigated Manufacturing Complexity, Maintenance and Cost

Consider the high mechanical complexity, helicopter tilt-rotor, VTOL airplane tilt-wing and VTOL tilt-rotor assemblies. These mechanically complex structures comprise numerous individual components, incurring both high manufacture and maintenance costs. The absence of dynamic airfoil control surfaces on an optimal number of a plurality of parallel wings of the CPA multi-wing assembly, absent associated mechanical linkages, servo actuators and control systems, provides for mechanical simplicity with diminished associated manufacture and maintenance costs.

High Fuel Efficiency Dual Role Aircraft

The CPA achieves VTOL capability with high maneuverability commensurate with that of a helicopter. Before transitioning from the horizontal to the aerodynamically efficient vertical operational orientation, the CPA must achieve sufficient air velocity with an angle-of-attack, of the multi-wing assembly, below stall. Also, before such transitioning and while in the horizontal operational orientation, the wing planform parasitic drag area exposed in a direction perpendicular to the aircraft's velocity is dramatically reduced by the integer number of the plurality of parallel wings of the multi-wing assembly. Thus, before such transitioning from the horizontal operational orientation, due to the combination of high lift, enhanced pitching moment of inertia and low aforementioned parasitic drag imposed by the multi-wing assembly, the CPA achieves rapid transitionability. After the transition from horizontal to vertical operational orientation is achieved, the CPA achieves high fuel efficient aerodynamically flight capabilities during non-hover flight maneuvers commensurate with that of fixed wing aircraft.

Dynamic Fuselage Orientation

The CPA architecture provides for a high degree of accessibility of the fuselage and its interior. The CPA is imbued with dynamically adjustable fuselage orientation ability such that when the CPA is stationary on the ground, the fuselage floor may be oriented so as to be essentially resting horizontally at ground level thus permitting convenient accessibility of a fuselage interior cockpit, cabin or other payload compartment, from the exterior.

Dynamically adjustable fuselage orientation also provides for a high external field-of-view optical visibility with high temporal availability from within the fuselage interior, regardless the operational orientation of the multi-wing assembly.

Further Improvements

Yet further improvements can be made to the CPA by anticipating additional wing element planform profiles of the multi-wing assembly in addition to the rectangular planform profile illustrated in (FIG. 1, 2), such as and not limited to the trapezoidal and elliptical planform. It is anticipated that the parallel wings may also be staggered to mitigate aerodynamic interference.

It is also anticipated that the form of thrust generation system used by the CPA should not be limited to the herein described preferred embodiment. In this regard, the currently espoused propeller thrust generators may be substituted by turbines.

Just as the current embodiment of the aircraft describes a fuselage free to rotate in one dimension about an axial shaft, it is also anticipated that the fuselage interior may provided a second degree of axial rotational freedom. In this regard, it is anticipated that the mechanical construction of the fuselage interior be separately constructed upon and free to rotate about a second internal fuselage servo axial shaft perpendicular to the herein described fuselage-servo axial shaft 35 with continuation of said axial shaft 37.

While implementations are described herein by way of example, those skilled in the art will recognize that the implementations are not limited to the examples or drawings described. It should be understood that the drawings and detailed description thereto are not intended to limit implementations to the particular form disclosed but, on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

What is claimed is:
1. An aircraft capable of vertical takeoff and landing comprising:
   a fuselage;
   a multi-wing assembly comprising:
      a plurality of groups of wings wherein:
         each group of wings comprises a plurality of parallel wings, wherein the wings are stacked and statically connected with a plurality of struts,
         the plurality of groups of wings are arranged symmetrically about a point within the fuselage in a plane normal to the chords of the wings,
         the wings of one group are parallel to the wings of any other group, the plurality of groups of wings are statically connected with a plurality of struts,
the plane is bounded by the spans of the first wing of the first group of wings and the last wing of the last group of wings, and
a shape of the plane is square.

\* \* \* \* \*